Feb. 24, 1931.                L. H. CHURCH                1,793,883
                        CABLE CONNECTER COUPLER
                          Filed Jan. 13, 1927
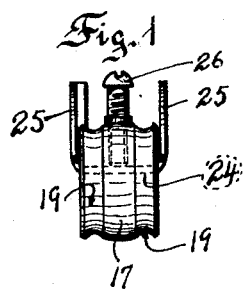
Fig. 1
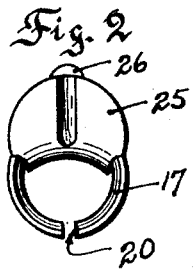
Fig. 2
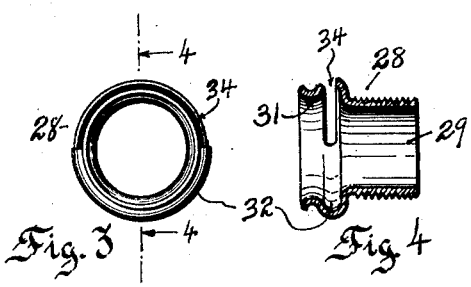
Fig. 3  Fig. 4  Fig. 5
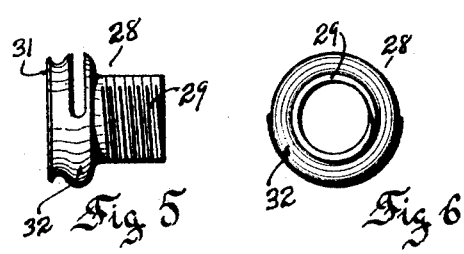
Fig. 6
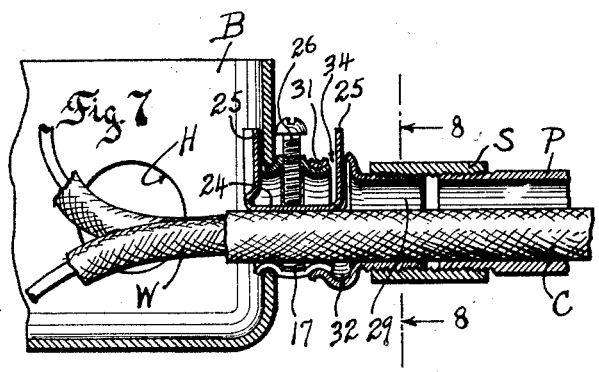
Fig. 7  Fig. 8
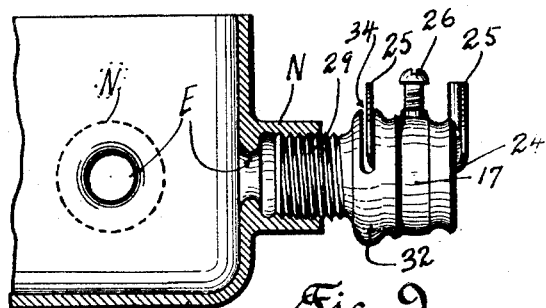
Fig. 9
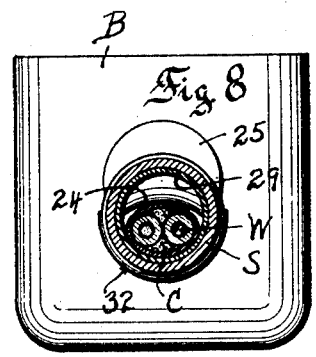
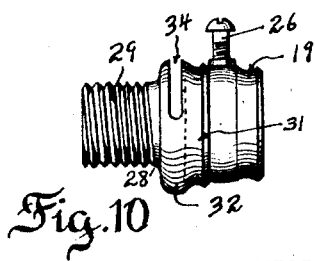
Fig. 10
INVENTOR
Lewis H. Church
BY
Bohleber & Ledbetter
ATTORNEYS Patented Feb. 24, 1931

1,793,883

UNITED STATES PATENT OFFICE

LEWIS H. CHURCH, OF ELIZABETH, NEW JERSEY, ASSIGNOR TO THE THOMAS & BETTS CO., OF ELIZABETH, NEW JERSEY, A CORPORATION OF NEW JERSEY

CABLE-CONNECTER COUPLER

Application filed January 13, 1927. Serial No. 160,847.

This invention relates broadly to cable connecters and pipe couplers, and particularly relates to coupling members for cable connecters whereby the cable connecter may itself be attached either to a pipe or to an outlet box, and I have for convenience called the invention a cable connecter coupler.

An object of the invention is to produce a cable connecter coupler adapted to be combined with a cable connecter to render the connecter universal in use, i. e. to make the connecter attach either a pipe or a cable to a box, or to make a connecter attach both the cable and pipe to a box; and it is an object to attach a connecter to either kind of box whether of the knock-out opening or threaded neck type of box.

This invention permits the attachment of conduits or pipes for electric wires and cables to outlet boxes having the usual knockout openings or holes, with provision, as by the use of a cable connecter, for fastening the wires proximate the opening of the box. The invention also permits the use of cable connecters with outlet boxes of the kind in which the wire entrances are formed in the box by threaded necks ordinarily intended to receive a threaded pipe end.

According to the present invention a coupling member or connecter coupler is provided having means to engage a cable connecter and means for engagement with a pipe coupling threaded neck on the outlet box. More particularly, in connection with expansible sleeve type connecters having box hole anchorage means such as grooves, the connecter coupler is formed at one end to receive the connecter sleeve end and preferably conform to the connecter box hole anchorage groove for that purpose; while at the other end, the connecter coupler is formed with an outwardly threaded neck of a gauge equal to that of the pipe with which a cable connecter is to be attached or of a gauge equal to that of the wire entrance neck on the outlet box.

The invention also seeks to permit the use of an adapter cable clamp plate of a shutter type with cable connecters in these situations. To this end the connecter coupler, which may take the form of a sleeve, is provided with a cut away portion, such as a slot, through which a shutter on the cable clamp plate may slide in adapting itself to different sizes of cable.

These and other objects of the invention and the means for their attainment will be more apparent from the following description, taken in connection with the accompanying drawings illustrating an embodiment of the invention, in which:

Figures 1 and 2 are views, in side elevation and end elevation, respectively, of a cable connecter of an adapter shutter type to which the connecter coupler, according to the present invention, is applicable.

Figures 3 to 6 inclusive show an example of the cable connecter coupler.

Figure 3 is an end view of the connecter coupler looking from the left in Figure 5 which shows the end which attaches to a cable connecter.

Figure 4 is a longitudinal sectional view taken on the line 4—4 of Figure 3.

Figure 5 shows the connecter coupler in side elevation.

Figure 6 is the other end view of the connecter coupler, looking from the right in Figure 5 which shows the end which attaches to a pipe or box neck.

Figure 7 is a longitudinal sectional box assembly view showing a cable connecter anchored in an electric outlet box and employing the connecter coupler to attach a pipe containing a cable to the cable connecter and hence to a box.

Figure 8 is an outside box assembly view and a transverse sectional view on the line 8—8 of Figure 7.

Figure 9 illustrates the use of the connecter coupler anchoring a connecter to an outlet box wherein the cable entrance is formed in the box by a threaded neck.

Figure 10 is a view of the connecter coupler attached to a cable connecter of the plain sleeve type, i. e. without the adapter and shutter clamp plate.

Electric outlet boxes B (Figure 7) are manufactured with knockout openings or holes H to receive cable C and to receive connecters which anchor the cable to the box B and electric wiring connections are made inside the box with the wires W extending from the cable into the box. My invention makes it possible to attach a pipe and a connecter to this type of box.

Outlet boxes BN (Figure 9) are also in use in electrical installation wherein, in lieu of knockout openings, the entrances or box holes E for the wires are formed by internally threaded necks N. My invention also makes it possible to anchor a connecter to this type of box.

In both instances, i. e. with either type of box B or BN, my invention renders it possible to quickly attach a pipe to a box B not ordinarily designed to receive a pipe, and makes it possible to anchor a connecter in a box not ordinarily designed to receive a connecter. One and the same connecter coupler performs these two functions and others.

One form of a cable connecter to which the present invention is applicable is a split type sleeve connecter illustrated at 17 in Figures 1 and 2 and may be formed of resilient metal, in sleeve form, having a box hole anchorage groove 19 proximate one or both ends. The ends of the stamping, from which this connecter member 17 is formed, come together to form a longitudinal split 20 which permits the connecter member to be contracted, that is, its circumference reduced, for insertion to snap it into a box hole H. The box hole edge is engaged, upon expansion of the connecter member 17, within one of the grooves 19, as shown in Figure 7, to effect anchorage of the connecter member 17 in a box hole. While a grooved sleeve type part 17 is shown, other forms of connecter members and box anchorage means therefor may be used.

The sleeve 17 is adapted to receive a cable C. Within or upon this connecter may be mounted, if desired, an adapter cable clamp 24, whereof the ends are turned upwardly at substantially right angles to form sleeve or box hole shutters 25. The shutters 25 are of such dimensions as to close the end or ends of the sleeve 17, or that portion thereof unoccupied by the cable C, and close the box hole H against the admission of dirt or plaster into the interior of the electric outlet box B. The shutters 25 also serve as positioning means to prevent axial displacement of the cable clamp plate 24 and as guiding means therefor as it is manipulated toward or away from the cable C and with respect to operating means such as the screw 26, which is threaded through a hole tapped in the connecter member 17, to drive or force the clamp plate 24 against the cable C and thus clamp the cable in the connecter and in so doing simultaneously cause the expansion of the sleeve 17 to anchor the connecter in the box hole H. I have elsewhere covered the above briefly described new and useful cable connecter 17.

Coming now more particularly to the present invention, in some situations, the cable C is conducted to an outlet box of either type B or BN through a conduit or pipe P, and provision is made to anchor the end of the pipe P to either outlet box in addition to fastening the cable by the connecter as just described, or by any other connecter which may be used with my new connecter coupler. The connecter 17 is relied upon to clamp the cable C and a cable connecter coupler or coupling member 28 is associated with the cable connecter 17 to secure the end of the pipe P to the connecter sleeve 17 by which in one instance, Figure 7, to fasten the pipe P to box B.

The connecter coupler 28 takes the form of a sleeve whereof one end 29 is outwardly threaded and is of a diameter equal to the gauge of the pipe P which is secured thereto by an ordinary pipe sleeve S. The sleeve end 31 of the connecter coupler opposite to the threaded neck 29 is designed to snap and connect onto a cable connecter 17 and is of enlarged diameter for that purpose and is formed radially inwardly with the annular shoulder 31 to engage with the box hole anchorage groove 19 on the connecter sleeve 17. Thus the cable connecter sleeve 17 may be contracted and inserted within the end 31 of the connecter coupler 28 and permitted to again expand to engage the interior of the coupling member 28, the shoulder 31 thereof fitting within the box hole anchorage groove 19 to hold the two parts 17 and 28 together in one assembled structure.

To avoid all interference of operation of the adapter cable clamp 24—25, i. e. to permit free movement of the shutters 25 thereof, the coupling member 28 is provided between the ends thereof with an outwardly pressed portion 32 forming an interior annular groove 32 sufficiently large to receive and within which a shutter 25 of a cable connecter may reciprocate, one part of the portion 32 being cut away to form a peripherally extending slot 34 through which the shutter 25 may freely pass.

When a cable connecter is assembled with an outlet box B, with the box hole anchorage groove 19 of the connecter engaging the box hole edge H, its other or opposite end may be inserted within a coupling member 28 and a pipe P secured to the coupling member 28 by an ordinary pipe threaded sleeve S. The adapter clamp plate 24—25 may be run down into clamping engagement with a cable by the operating screw 26 since a shutter 25 on the adapter plate 24 is permitted to reciprocate freely in the groove 32 and the slot, opening or cut-away portion 34 of the connecter coupler.

The coupling member 28 secured as described on a connecter 17 may also be availed of to secure the connecter 17 to an outlet box BN wherein the entrance E for the wires is defined by an interiorly threaded neck N. In this instance, the threaded connecter coupler neck 29, either before or after a connecter sleeve 17 has been inserted therein, may be screwed into the box neck N as shown in Figure 9 and a cable led to the box BN may be anchored by the adapter clamp plate 24—25.

It will thus be seen that a cable connecter coupler has been provided which widens the usefulness of a cable connecter since it enables the same to attach a conduit or pipe P to an outlet box formed with knockout openings H while also fastening the cable against movement and it also permits a cable C to be secured by means of a cable connecter to an outlet box BN whereof the wire entrance is defined by a pipe receiving neck N.

What is of particular importance is the fact that this invention enables cable of any kind, metal armored, fibre armored or soft cable, to be connected to either box type B or BN. The cable C shown is what may be called soft cable and is now coming into use. It is small in size and hence the shutter 25 type of cable connecter 17 closes that part of the connecter sleeve not occupied by the cable, but if larger size cable say metal armored cable is used this connecter is just as applicable to the work because the adapter 24—25 moves out from the center of the sleeve to enlarge the sleeve passage.

However, it may be presumed that very large metal armored cable is to be connected with a box in some particular place and that the adapter is in the way. In that event the adapter 24—25 is simply removed and the connecter becomes an ordinary split sleeve screw expansible connecter as in Figure 10 where a coupler 28 is shown attached to a plain connecter. In this situation where metal armored cable, not shown, is used instead of soft cable C shown, the pipe P is not needed. It is perfectly clear that metal armored cable can be secured to either type box by one and the same connecter 17.

Likewise it is clear enough that frequently, in using soft cable C, it may be desired, to run it through a pipe P. But in that event, a type of box B may already be installed or may be the only convenient box at hand and if it were not for my coupler member 28, the pipe P could not be readily attached to this box B and include a cable connecter at the same time.

Suppose again it is the type box BN with which the mechanic is confronted in his work and that he desires to use soft cable concealed in a pipe P; he simply uses two couplers 28, one on each end of a connecter 17, which is to say he uses two couplers 28 with a connecter therebetween. One coupler screw fastens into the box neck N and the other connecter screw fastens to a pipe.

The invention lends itself admirably for use in connection with my improved shutter type cable connecter 17 and thereby widens the range of that cable connecter itself. Equipped with both of my improvements in electrical fittings, i. e. with a supply of shutter connecters 17 and couplers 28, there are few if any cable and box assemblies that cannot be made on the spot and the contractor is therefore not required to load himself up with many different kinds of connecters merely that all contingencies may be met. This invention meets them and with fewer parts and less expense.

What I claim is:—

1. A coupling member for a connecter having a shuttered adapter cable clamp plate, said coupling member comprising a sleeve, means at the sleeve end to receive an end of a connecter member and at the other end a threaded neck, and a circumferential opening in said member to permit the operation of an adapter cable clamp shutter.

2. A coupling member for a connecter having an adapter cable clamp plate carrying a shutter, said coupling member comprising a sleeve having at one end an outwardly threaded neck and, at the other end, a connecter receiving portion, said coupling member being circumferentially slotted to permit the passage of a shutter through the coupler.

3. A coupling member for a sleeve type expansible connecter formed with a box hole anchorage groove, said coupling member comprising a sleeve having at one end an outwardly threaded neck of reduced diameter and interiorly of the other end a shoulder to be engaged by the box hole anchorage groove on the connecter.

4. A coupling member for a sleeve type expansible connecter formed with a box hole anchorage groove and having a shuttered adapter cable clamp plate, said coupling member comprising a sleeve, means at the sleeve end interiorly formed to receive and conform to the box hole anchorage groove of a connecter member and a threaded neck at the other end of the sleeve, said sleeve having a circumferential opening to permit the operation of an adapter shutter.

5. A coupling member for a sleeve type expansible connecter formed with a box hole anchorage groove and having an adapter cable clamp plate carrying a shutter, said coupling member comprising a sleeve having at one end an outwardly threaded neck of reduced diameter, and a shoulder interiorly of the other end to be engaged by the box hole anchorage groove, said sleeve being circumferentially slotted for the passage of a shutter.

6. A coupling member for a sleeve type expansible connecter formed with a box hole anchorage groove and having an adapter clamp plate and a shutter carried with said plate, said member comprising a sleeve having an outwardly threaded neck of reduced diameter at one end and a shoulder interiorly of the other end to be engaged by the box hole anchorage groove, said sleeve being inwardly grooved for holding the coupling member in position and said grooved portion being circumferentially slotted for the passage of a shutter.

7. A cable connecter coupler comprising, a sleeve member, one end of which is reduced in size and threaded to connect with a pipe or box neck, the other end thereof being enlarged in size to receive a cable connecter sleeve telescoped with the first sleeve member and being further enlarged to receive a movable connecter shutter, and a shutter slot being provided circumferentially in the larger portion through which a shutter may move transversely to the axis of the sleeve member.

8. A coupling member for a sleeve type expansible connecter formed with a box hole anchorage groove and having an adapter clamp plate and shutter carried with said plate, said member comprising a sleeve, a threaded neck at one end of said sleeve, a shoulder interiorly of the other end to be engaged by the box hole anchorage groove, a cut away portion in said sleeve for the movement of a shutter.

In testimony whereof I affix my signature.

LEWIS H. CHURCH.